Nov. 16, 1965  G. L. TRAVERS ETAL  3,218,209
METHOD OF MANUFACTURING TIRE CASINGS AND THE RESULTING PRODUCT
Filed Oct. 10, 1960  3 Sheets-Sheet 1

INVENTORS
GEORGES LOUIS TRAVERS
GABRIEL ROGER XAVIER BOUSSU
BY
Brumbaugh, Free, Graves & Donohue
THEIR ATTORNEYS

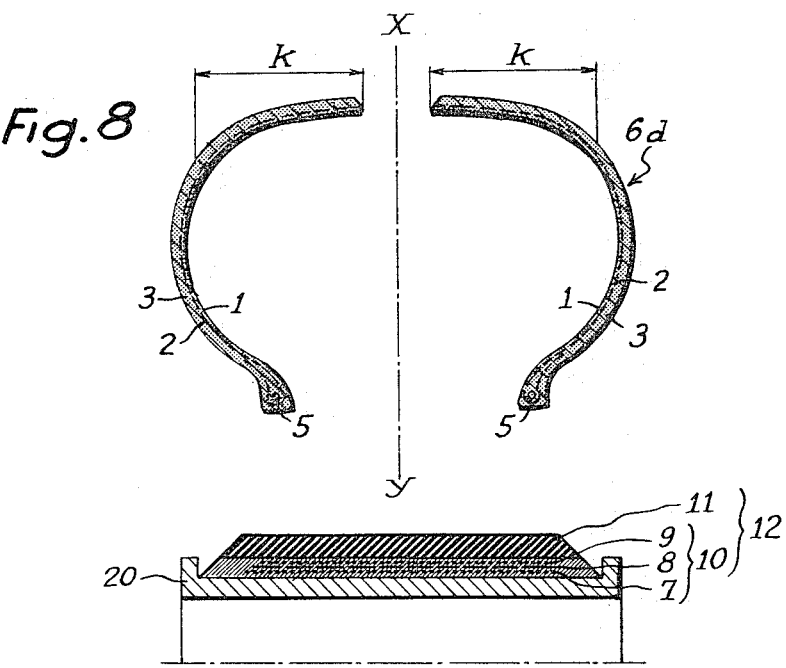
Fig. 8
Fig. 6
Fig. 7
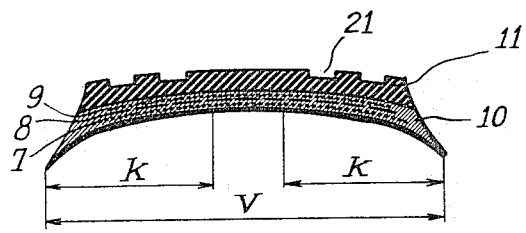
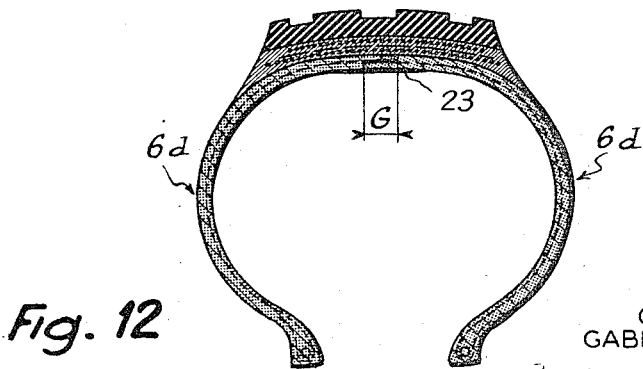
Fig. 12
INVENTORS:
GEORGES LOUIS TRAVERS
GABRIEL ROGER XAVIER BOUSSU
BY
THEIR ATTORNEYS

INVENTORS
GEORGES LOUIS TRAVERS
GABRIEL ROGER XAVIER BOUSSU
BY

THEIR ATTORNEYS

United States Patent Office 3,218,209
Patented Nov. 16, 1965

3,218,209
METHOD OF MANUFACTURING TIRE CASINGS AND THE RESULTING PRODUCT
Georges Louis Travers, Clermont-Ferrand, and Gabriel Roger Xavier Boussu, Rus Pascal Chamalieres, France, assignors to Michelin & Cie, Clermont-Ferrand, France
Filed Oct. 10, 1960, Ser. No. 61,582
Claims priority, application France, Oct. 23, 1959, 808,303, Patent 1,247,487
3 Claims. (Cl. 156—123)

This invention relates to the manufacture of pneumatic tires for vehicles and it relates more particularly to methods of manufacturing the casings of the tube-containing or tubeless varieties and to the resulting products.

The method most generally used for manufacturing pneumatic tire casings for vehicles comprises:

(1) Applying one after another around a building drum the various plies or layers of uncured rubber and of cords which will make up the body of the tire casing; the cord plies usually are anchored, at each end of the drum, around at least one metallic reinforcement ring called "the bead wire";

(2) Applying in the central zone of this assembly the reinforcing plies sometimes used for stiffening the tread; such plies may be made of a textile or metallic cord fabric or of rubber having a high modulus of elasticity, or a combination of these two materials;

(3) Covering the whole assembly by the tread composed of a relatively thick layer of uncured rubber;

(4) Giving the cylindrical band thus obtained a toroidal shape approximating that of a finished tire casing; this manufacturing step, called "shaping," is generally carried out in a tire shaping machine by using compressed air and/or vacuum;

(5) Placing the torus thus obtained into a curing mold in which the tire casing is vulcanized and takes its final form, and the usual grooves of varying depth are molded into the tread.

As an alternative, the shaping operation mentioned under (4) above can be carried out before the tread reinforcement plies and the tread itself are applied. Also, the cylindrical band may be shaped to tire form and cured in a combined shaping and curing press.

In order to ensure perfect location of all the components of the tire casing, to eliminate any air entrapped between them and to obtain a casing which is as well balanced as possible, the steps listed above must be performed with great care by skilled workers or by means of wholly or semi-automatic machinery which is complex and costly. Moreover, each tire casing size must be manufactured separately; for instance, a tire casing of the commercial size 9" x 20" cannot be built and cured with the same equipment as one of the sizes 10" x 20" or 11" x 20" in spite of the fact that all three sizes of tire casings fit 20 inch wheel rims.

Moreover, inasmuch as it is desirable to match each type of tread pattern to the nature of the ground on which the tire casing will be used, or the type of service in which it is used, e.g. racing cars, passenger cars, trucks, etc. different molds must be used for each tire size and pattern, thereby leading to much higher equipment and manufacturing costs, especially with small scale production.

Another disadvantage of the conventional manufacturing method is experienced while the tire casings are in storage and during the transportation or shipment. This disadvantage is a direct result of the shape of the tire casings, which makes it only possible to pile them up one on top of the other. Thus, the available volume of storage facilities is not used as much as it could be and, on the other hand, it often is the cause of deformation of the casings. Such deformation may become permanent and is particularly troublesome in tubeless tire casings, because it jeopardizes the air tightness between each tire bead and the adjacent wheel rim flange.

According to the present invention, certain components of the tire casing, especially the tread and the body, are built and vulcanized separately and subsequently assembled to form a tire casing.

More particularly, in accordance with the invention a tire body is manufactured in such a way that it can be separated into a plurality of symmetrical sections, which can be reassembled with a vulcanized tread band to form any of a series of tire casings of different cross-sectional diameters but having the same wheel or rim size. In a preferred form of the invention the tire body may be built on a drum and separated along its equator into separate symmetrical halves which can be reassembled with a tread and with different spacings between them to provide different tire sizes.

It is also possible to manufacture separately, the various components of the tire casing or tire body halves, i.e. the various rubber layers, the cord plies if any, and the beads.

The reinforcement plies of the tread may be built and vulcanized independently of the tire body or of the tread, or with any of these two components. Further, each ply making up the tread reinforcement may be vulcanized separately. When the assembly of the tire cover takes place, one or more such tread plies may then be used.

Final assembly of the various prefabricated components is carried out according to the methods well known to tire retreaders, that is to say by buffing or brushing up the parts to be assembled and subsequently applying on to them a gum cement which cures when submitted to heat or at a relatively low temperature of the order of 25° C. Thin layers of calendered uncured rubber may be used to cement the parts together, if desired. If a hot curing cement is used, the prior treatment of the tire casing components should involve only a partial cure which is completed after they have been assembled by heating the assembly in a pressurized vessel. When a cement is used which cures at about 25° C., the prefabricated components may be completely cured; in this case, vulcanization of the final assembly may take place at a lower temperature.

Although it may be applied to the manufacture of any type of tire casings for passenger cars, trucks and other heavy duty vehicles the new method is particularly applicable to the manufacture of tire casings having bodies containing a relatively small number of reinforcing plies or partially or entirely devoid of them, whereas the tread is greatly strengthened by several plies of cord fabric in parallel or crossed relationship and embedded in a rubber of ordinary or high modulus of elasticity.

The apparatus required for building up and vulcanizing the various tire components individually is less complex than for manufacturing a complete tire casing. The vulcanizing time can be adapted to each component, whereby the risk of overcuring the thinnest parts of the casing is eliminated.

A typical example of the method of this invention is described hereinafter with reference to the annexed drawings in which;

FIG. 6 shows the tread reinforcement plies and the tread assembled on a tire building drum;

FIG. 7 shows the reinforced tread after it has been molded and cured;

FIG. 8 is a view of the two tire body halves obtained by cutting the tire body of FIG. 5;

Figure 9:
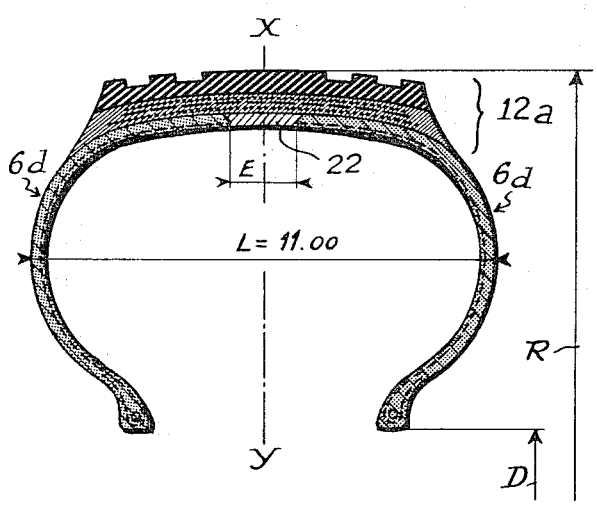
Figure 10:
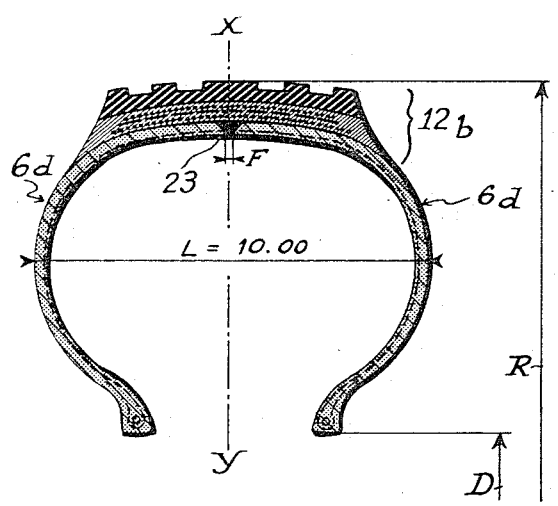
Figure 11:
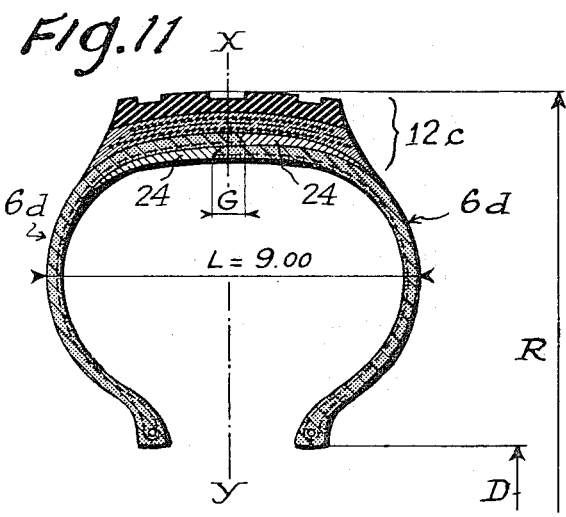
Figure 13:
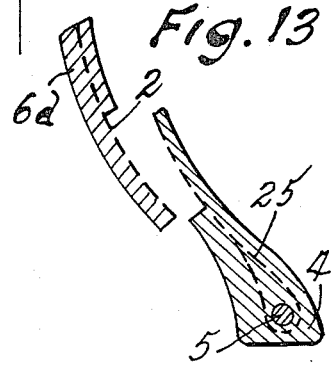

FIGS. 9, 10, and 11 show three tire casings of different sizes assembled according to the invention;

FIG. 12 shows an alternative embodiment of a detail of the casing shown in FIG. 11;

FIG. 13 shows an alternative way of manufacturing the beads of the tire shown in FIGS. 9 to 12.

Figure 1:
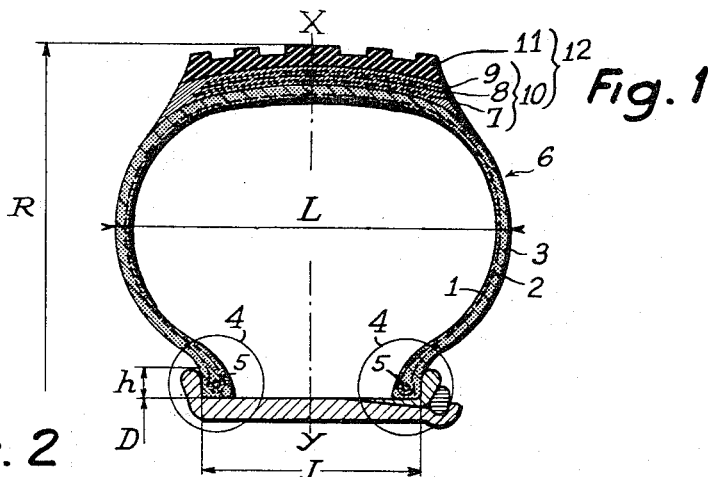
FIG. 1 is a cross section taken through a tire casing.

FIG. 1 shows the main components of a pneumatic tire casing of the type selected to illustrate the invention. A layer of rubber 1 lines the inside of the casing; on this layer 1 is laid the reinforcement 2 made up of one or more superimposed cord plies. This reinforcement 2 is topped by one or more rubber sheets 3. The whole assembly extends between the two beads 4; the cord plies are turned up around at least one bead wire 5. Components 1 to 5 make up the so-called body 6 of the casing.

Three superimposed reinforcing plies 7, 8 and 9 form a reinforcing assembly 10 for stiffening the grooved tread 11 of the casing. Fewer or more plies can be used in the assembly 10. The plies 7, 8 and 9 may be composed of cords or metallic cables or the assembly 10 can be composed of a thin steel band or of a layer of high modulus rubber with or without reinforcing cords or cables (hereinafter referred to as cords), the important feature being that the assembly 10 imparts to the tread 11 a great transversal rigidity of its own, not related to that of the body 6.

The casing illustrated has a section width L, a bead diameter D and a radius R when inflated at the normal pressure and free from any load. In the trade, tire casings are designated by the values of L and D expressed in inches.

The manufacture of one casing of each of the sizes 11" x 20", 10" x 20" and 9" x 20" will now be described. It is obvious that a figure common to these three commercial sizes, is the bead diameter D, 20". Dimension L is different in each case (11", 10" and 9") and so is the radius R which is respectively equal to 20", 20.7" and 21.3". With the methods previously known, the manufacture of these casings would require three different machines for building each body 6 and for curing each casing. The method according to the invention reduces the number of the machines and secures, moreover, economic and qualitative advantages which will appear in the following description.

Figure 2:
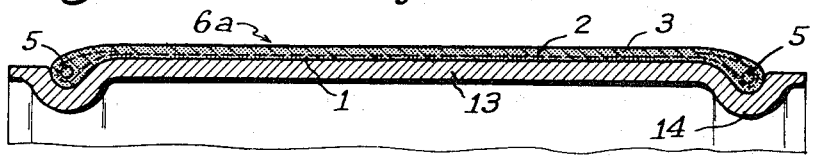
FIG. 2 is a longitudinal section through a tire building drum on which a tire body has been built.
Figure 3:
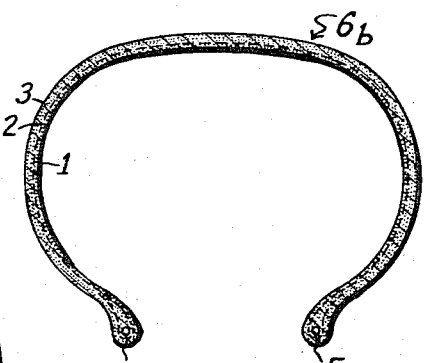
FIG. 3 shows the tire body of FIG. 2 after it has been shaped to tire form.

Referring now to FIG. 2, a substantially cylindrical tire body 6a is built in the usual way on a tire building drum 13. The body includes, in the embodiment taken as example, a layer of uncured rubber 1, a cord ply 2 and finally another layer of uncured rubber 3. The reinforcement ply 2 is anchored, at each end of the drum, around a bead wire 5. It should be pointed out that there is no difficulty in building up the tire body since the laying down of its various components requires no special precaution inasmuch as the distance between the two bead wires is fixed by a circular groove 14 at each end of the drum. The cylindrical band 6a is then subjected to the usual shaping operation to become a torus 6b having a shape very similar to that of the finished tire casing (see FIG. 3). The shaping operation will be effected without causing displacement of the reinforcing cords in the tire body or of the rubber sheets which surround them. Such displacements sometimes occur when the cylindrical band is shaped to a torus form after it has been topped by the tread reinforcing plies and by the tread itself. With the tire body being shaped without such reinforcing plies and without a tread, its architecture is free from defect and perfectly balanced.

Figure 4:
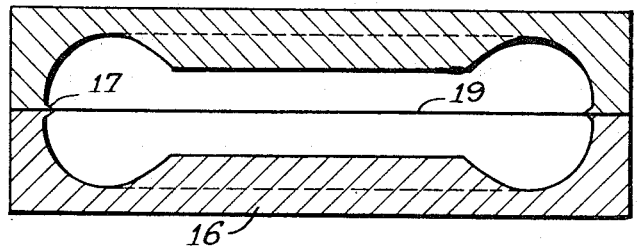
FIG. 4 is a cross section through a curing mold for the tire body of FIG. 3.
Figure 5:
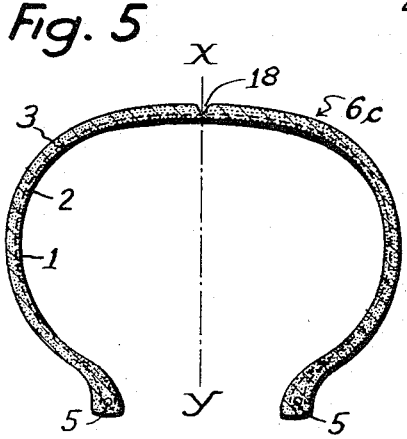
FIG. 5 shows the tire body of FIG. 3 after molding and curing.

After having been shaped as described above, the tire body is cured in a two-part annular mold 16 (see FIG. 4) devoid of tread pattern matrices but having at the junction line between its two halves, a bead 17, the cross-section of which is substantially triangular. Its purpose is to form in the external rubber sheet 3 a groove 18 (see FIG. 5) exactly located in the longitudinal mid-plane XY or equator of the tire body. The height of the centering bead 17 is equal to the depth of the rubber sheet 3 so that the metal of the mold comes flush with the cord ply 2. One of the advantages of such an arrangement in combination with the unavoidable clearance 19 between the two mold halves is to allow air entrapped during the building operation on the drum between the layers 1, 2 and 3 to escape to the atmosphere when, at the beginning of the curing process, the uncured rubber softens. Such escape is made much easier by the fact that since only the tire body is to be cured, the thickness of the rubber is much reduced as compared with the curing of a complete tire casing. After the curing operation, the tire body 6c (FIG. 5) is still perfectly balanced; its geometrical shape is well defined and no air is entrapped between or in its components thereby avoiding ply separation when in service. Curing of the tire body alone, i.e. without the tread reinforcement 10 and the tread itself, can be carried out in a substantially shorter time than when both these components are present.

The tread 11 with its reinforcing ply assembly 10 is now built on a drum 20 (FIG. 6). In the following description, the unit made up of the tread proper 11 with its reinforcing plies 7, 8 and 9 will be called the reinforced top 12. It is built up by laying around the drum 20 the plies 7, 8 and 9, and the tread 11 successively, the tread being in the form of an uncured rubber sheet, usually formed by extrusion. The reinforced top 12 thus built is placed in a mold of very simple construction which impresses the anti-skid grooves 21 into the tread 11 and cures the whole unit in more favorable conditions of time and accuracy than when the complete casing has to be cured. Alternatively, the reinforced top 12 could be manufactured by any known molding method instead of being built on a drum as previously described.

After the reinforced top has been manufactured, two distinct vulcanized components are available; they are the tire body 6c (FIG. 5) and the reinforced top 12 (FIG. 7).

If it is intended to manufacture tire casings of the sizes 11" x 20", 10" x 20" and 9" x 20", three reinforced tops will have to be manufactured whose width corresponds to each of the three different dimensions L (11", 10" and 9"), but only one tire body size (20 inches) will be required.

As shown in FIG. 8 the tire body 6c will be severed along its longitudinal mid-plane XY into two halves 6d (FIG. 8), for instance by means of a knife guided in the centering groove 18. The knife may be a part of a machine in which the body is supported and rotated. Such a machine has no special feature of its own and its principle of operation is well-known in the tire industry for carrying out various cutting operations.

After having been cut into two halves, three distinct vulcanized components are provided, namely the reinforced top 12 and two substantially mirror image body sections 6d.

In order to manufacture an 11" x 20" cover (see FIG. 9) a reinforced top 12a with a width V (FIG. 7) corresponding to a tire section of 11" will be selected. Along a width K (FIG. 8) of at least 2", the internal edges of the reinforced top 12a and the external edge of each body section 6d will be buffed and coated with a rubber solution of suitable composition. Such solution may, for instance, be of the heat-vulcanizing type. If desired, films of uncured rubber may be inserted between the parts to be assembled. After having been prepared as said above, the three components will be assembled on a form to make up a complete tire casing having a section width L of 11″, a bead diameter D of 20″ and a radius R of 21.3″.

The width K along which the components will be assembled is a function of the rolling radius R; the greater R is, the smaller K. Due to the stiffness and strength of the reinforced top 12a, the gap E in the tire body does not impair the overall strength of the tire casing. In order to avoid any break of continuity inside the cover, the gap E may be filled by a layer 22 of rubber. After the tire casing is assembled it is placed in an autoclave or other vessel and is heated until the components of the casing are bonded together by vulcanization. If care is taken to use as a bonding agent a rubber solution which cures at a temperature substantially lower than that of each of the components making up the assembly, the quality of the rubber already cured will in no way be degraded by the second heating. As already said above, it is also possible, at the time the first cure of the individual components is effected, to make allowance for the subsequent heating and not to drive the vulcanization to completion. Also it is possible to use, for assembling the vulcanized components, one of the commercially available cold-vulcanizing rubber solutions.

In order to manufacture a 10″ x 20″ casing (FIG. 10), a reinforced top 12b with a width V corresponding to a tire section of 10″ will be selected. The two body sections 6d will be identical to those used for making the 11″ x 20″ cover as described above since the bead diameter D is identical (20″). The bonding and heating of the three prefabricated components will be effected as previously described. The distance F between the two opposed edges of the body sections will be smaller than the distance E and might even be zero since for a casing of lesser width (10″ instead of 11″) body halves of the same size are used in both cases.

In order to manufacture a 9″ x 20″ casing (FIG. 11), a reinforced top 12c with a width V corresponding to a tire selection of 9″ will be selected. The two body sections 6d will still be identical to those used for making the 11″ x 20″ and 10″ x 20″ casings since the bead diameter D is identical (20″). The tire section being smaller than in the two preceding instances (9″ instead of 11″, respectively 10″), the two edges of the body sections will overlap a certain distance G. In this case, the assembly can be made as shown in FIG. 11, i.e. in overlapping relationship without any removal of rubber. A rubber strip 24 of tapering cross section may then be inserted at each end of the body halves to fill up the gap on the right side and to even out the protruding edge on the left side. Alternatively (see FIG. 12), the overlapping portion G can be cut to provide a half-lap fit, whereby the increased thickness in said portion is reduced to a negligible value. For additional smoothness, a rubber band 23 can be used to cover up the joint between the body section.

In the embodiments shown in FIGS. 11 and 12 the reinforcing 2 of the body halves 6d is therefore doubled in the portion G.

In FIG. 13, the bead 4 with the bead wire 5 and the reinforcing ply 25 are manufactured separately of the tire body, with which it may then be assembled. Such arrangement is of advantage when it is desired that the bead zones be made up of materials different from those used in the tire body.

The examples described above illustrate the process of making three casings of different sizes with a tire body of a single size. When it is desired to manufacture but one size of a tire body for making up tire casings of different sizes, the dimensions of the tire body should be determined accurately to make certain that it is right for the combinations in mind. In particular, the profile of the beads 4 will have to take account of the variables of the various rims on to which they will be fitted (width J of the rim base and height h of the rim flanged). Also, the reinforcement 2 and the bead wires 5 should be able to sustain the rated loads of the largest casing among the intended combinations. In this regard, it is to be noted that when the new manufacturing method is applied to tire casings with a body reinforced by at least one radial cord ply, i.e. cords laid in planes going through the axis of rotation of the wheel, the standard body reinforcement of the smallest cover of a selected series can be used for the largest casing of the selected series, because the overload capacity of casing having a radial cord reinforcement in their body is far higher than that of tire casings in which the body is reinforced only by cords laid on the bias.

With the method according to the invention, casings of identical sizes but having treads of different patterns, rubber compositions or thicknesses can be manufactured without incurring heavy expenses for altering the molding equipment.

Another very important advantage of the new method is that it is possible to produce tire casings in which the reinforcing cords and various rubber sheets are precisely positioned and related. The prefabricated components are formed accurately and their assembly, once they have been vulcanized, can be effected without misalignment. The resulting casings therefore are perfectly balanced in every plane, with a consequent improvement in the road holding qualities of the vehicles especially at high speeds.

Another advantage of the invention lies in the storage of the prefabricated components: they can be nested into one another, thereby greatly reducing the overall storage space needed as well as the danger of deformation.

Moreover, the manufacture of tire casings by assembling prefabricated tire components eliminates the need for highly skilled labor.

Also, whereas conventional tire sizes, in terms of cross-sectional width, change in whole units, for example from 9″, 10″ and 11″ without any intermediate size in order not to exceedingly diversify the tooling equipment, it is now possible to increase the number of sizes and to manufacture for example, tires having cross-sectional dimensions of 9.25″, 9.50″ and 9.75″ etc.

It should be understood that the new method of manufacturing tire casings from prefabricated components is not restricted to those in which the body is reinforced by means of a small number of cord plies or even by none, although in some casings such as shown in FIG. 11 too great a thickness of material in the zone of overlap is undesirable. Similarly, a tread containing a reinforcing assembly 10 is required only in cases where the tire body and its reinforcement are interrupted as shown in FIGS. 9 and 10. In tire casings where the tire body section overlaps (FIGS. 11 and 12) a stiffened tread is not essential.

From the foregoing description it will be understood that method and resulting tire casings are susceptible to considerable modification without departing from the invention. For example, it is possible to interfit the two edges of the body sections under the tread when they abut or when they overlap in different ways: for example by providing them with mating or complemental surfaces following a zig-zag or sinusoidal line. Also, many different casing section sizes can be manufactured by appropriate selection of the body sections and treads or tops of suitable size. Therefore the examples of the invention disclosed herein should be considered as illustrative.

We claim:

1. A method for manufacturing tire casings which comprises assembling at least one carcass reinforcing ply, a sheet of sidewall rubber and a bead for each of two-half sections of a tire body devoid of a tread, molding to shape and at least partially vulcanizing said plies, sidewall and beads to form two complete mirror image annular half-sections of a tire casing devoid of a tread, assembling separately an annular, vulcanizable tread top and a reinforcing band containing at least one reinforcing ply in which cords extend transversely of the tread top and are substantially coextensive therewith to form a tread band, at least partially vulcanizing said tread band and molding a tread pattern therein to form a complete relatively inextensible tread, assembling said two body sections with said tread and with edges of said body sections in any of a plurality of predetermined opposed relations to form tires of different sizes and with the reinforcing ply in said tread spanning said opposed edges and overlapping said body sections and said reinforcing plies therein a substantial distance to preclude separation of said body sections and vulcanizing said body sections and said tread together to form a complete tire casing.

2. The method set forth in claim 1 in which said carcass reinforcing ply, sidewall sheet and beads are assembled to form an endless band having said beads at its opposite edges, molding and at least partially vulcanizing said band to form a substantially complete toroidal tire body devoid of tread, and cutting said body along its equator to form said pair of half-tire body sections.

3. The method set forth in claim 2 comprising molding a groove in and extending around said band during vulcanizing to aid in cutting said body into said pair of sections.

References Cited by the Examiner

UNITED STATES PATENTS

| | | | |
|---|---|---|---|
| 844,820 | 2/1907 | Marks | 154—14 |
| 957,413 | 5/1910 | Constantin | 154—14 |
| 1,211,351 | 1/1917 | Price | 154—14 |
| 1,488,343 | 3/1924 | Hoffman | 154—14 |
| 1,732,793 | 10/1929 | Darrow | 154—14 |
| 1,954,926 | 4/1934 | Fraser | 156—96 |
| 2,153,965 | 4/1939 | Lejune | 154—14 |
| 2,339,559 | 1/1944 | Charnes | 156—95 |
| 2,649,891 | 8/1953 | Hinman | 154—14 X |

FOREIGN PATENTS

| | | |
|---|---|---|
| 56,006 | 3/1944 | Netherlands. |
| 549,925 | 11/1956 | Italy. |
| 72,088 | 4/1953 | Netherlands. |
| 746,375 | 3/1956 | Great Britain. |
| 94,289 | 1/1939 | Sweden. |

EARL M. BERGERT, *Primary Examiner.*

CARL F. KRAFFT, *Examiner.*